Oct. 14, 1947.   H. E. CROZIER   2,429,049
SINGLE-PHASE INDUCTION MOTOR CONTROL
Filed June 10, 1946
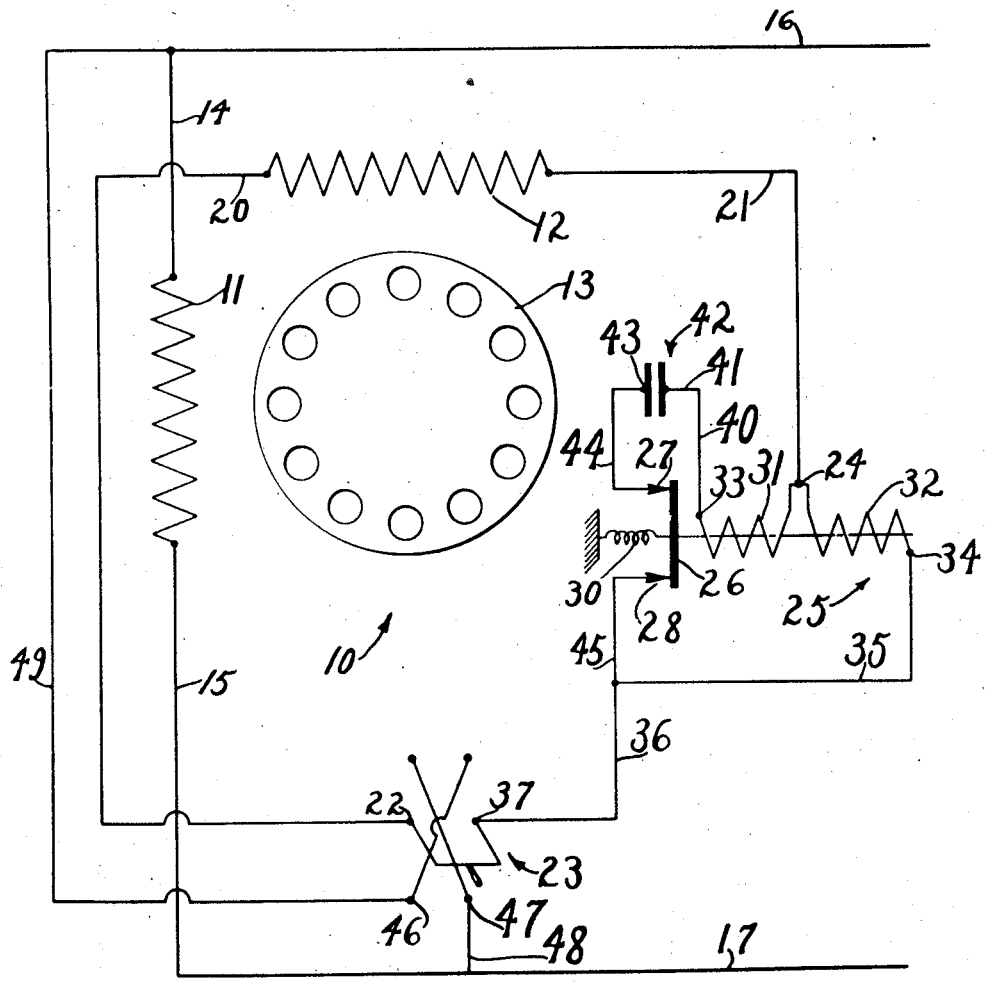
INVENTOR
HAROLD E. CROZIER
BY
Howard L. Johnson
Attorney Patented Oct. 14, 1947

2,429,049

UNITED STATES PATENT OFFICE 2,429,049

SINGLE-PHASE INDUCTION MOTOR CONTROL

Harold E. Crozier, Hawthorne, Calif.

Application June 10, 1946, Serial No. 675,548

8 Claims. (Cl. 318—207)

My invention relates generally to motor controls and more particularly to such controls for small electric motors of the so-called "split-phase" type wherein a capacitor is used to provide the necessary rotating fields for starting.

In the operation of small single phase motors of the capacitor type, it is customary to provide a starting winding which is connected in series with a capacitor so that there will be a phase difference between the starting winding and the main winding of the motor. This phase difference is used to provide the necessary torque to start the motor, and once the motor has reached full speed, the need for the starting winding is completely, or at least materially, eliminated. It has previously been proposed to provide a relay which will disconnect the starting winding and its capacitor when the motor has reached full speed, but the methods for doing this have generally relied upon the change in voltage appearing across the capacitor to operate the relay. This voltage change between stopped and full speed operation is relatively small, and any changes in spring tension, friction, and other factors which might influence the operation of the relay have tended to render this operation somewhat uncertain. I have found that by using a special type of relay which is so connected as not to rely solely upon the voltage change across the capacitor, the operation of the relay may be rendered more certain.

In addition, I have found that by the use of this relay, a switching means may be incorporated in the circuit which will permit the direction of rotation of the motor to be instantly reversed, a procedure which has heretofore been considered impractical.

It is therefore a major object of my invention to provide a motor control circuit for capacitor motors which is positive in operation.

Another object of my invention is to provide such a circuit which may be applied to all such motors having separate leads therefrom for the main and auxiliary starting windings.

It is a further object of my invention to provide a control circuit of this type which may be operated to reverse the direction of rotation of the motor even when the latter is operating.

Still another object of my invention is to provide such a control which is simple in operation and requires a minimum of parts.

These and other objects and advantages of my invention will become apparent from the following description of a preferred form thereof, and from the drawing illustrating that form in which the single figure is a schematic wiring diagram of a motor control constructed in accordance with my invention.

Referring now to the drawing, the number 10 indicates generally a motor of the type having a main field winding 11, an auxiliary or starting field winding 12, and a rotor 13 of the squirrel-cage type. Motors of this type are so well known and so widely used that no description of the mechanical features of construction are believed necessary to an understanding of the construction and operation of my control. The main winding 11 is provided with leads or connections 14 and 15 which, as is customary, are connected to conductors 16 and 17 which are in turn connected to a source of alternating current (not shown). The auxiliary winding 12 is provided with separate leads 20 and 21, of which lead 20 is connected to one terminal 22 of a reversing switch 23, while lead 21 is connected to the common terminal 24 of a relay 25. It will be seen that relay 25 includes an armature 26 which is normally urged against a pair of fixed contacts 27 and 28 by a relatively light spring 30, the armature acting as a bridging conductor to connect contacts 27 and 28.

To operate armature 26 and move it away from contacts 27 and 28 against the urging of spring 30, I provide a pair of windings 31 and 32 which are connected together at the common terminal 24 and are so wound that current flowing from the common terminal through coil 31 will produce a magnetizing effect which opposes the action of current flowing from terminal 24 through coil 32. When these two magnetic forces are equal, armature 26 will bear against contacts 27 and 28 to complete a circuit through the latter, but when the magnetizing effect of coil 32 exceeds that of coil 31, the armature is moved away from the contacts and the circuit is broken. Coil 31 is provided with a separate terminal 33, while coil 32 is also provided with a separate terminal 34, the latter being connected by conductors 35 and 36 to another terminal 37 of the reversing switch 23. Terminal 33 of coil 31 is connected by conductor 40 to one terminal 41 of a capacitor 42, the other terminal 43 thereof being connected by conductor 44 to fixed contact 27, while fixed contact 28 is connected by a conductor 45 to conductor 36.

The reversing switch 23 is provided with two additional terminals 46 and 47, the latter being connected by conductor 48 to line conductor 17 while terminal 46 is connected by conductor 49 to line conductor 16. In the form of switch shown, terminals 22 and 37 are connected to the blades of the switch, while terminals 46 and 47 are connected to clips adapted to receive those blades so that when the blades are in their lowermost position, terminal 22 is connected to terminal 46, while when the blades are in their uppermost position, terminal 22 is connected to terminal 47.

It will now be seen that main winding 11 is connected to line conductors 16 and 17 at all times, and that lead 14 is always connected to line conductor 16. In the case of the auxiliary winding 12, however, the situation is different. With switch 23 in its lowermost position, lead 20 is connected through terminals 22 and 46, and conductor 49 to line conductor 16; while when the switch is in its uppermost position, the lead 20 is connected through terminal 22 and 47, and conductor 48 to line conductor 17. The remainder of the circuit for the auxiliary winding 12 may be traced through lead 21 to terminal 24, through coil 32 and conductors 35 and 36 to terminal 37 of reversing switch 23. The latter, of course, connects conductor 36 to whichever of the line conductors 16 or 17 which is not connected to lead 20. The connection of lead 21 to coil 32 is complete at all times; but when the armature 26 is in its de-energized position, a circuit including coil 31, capacitor 42 and fixed contacts 27 and 28 is connected in parallel with winding 32.

Operation

When switch 23 is in its lowermost position and line conductors 16 and 17 are connected to a suitable source of power, the main field winding 11 is energized from the line and the auxiliary field winding 12 is energized through switch 23. When rotor 13 is stationary, the current from switch 23 passes through auxiliary winding 12, coils 31 and 32 of relay 25, and capacitor 42. As is well known in the art, the presence of capacitor 42 in the circuit causes a phase shift in the current passing through auxiliary winding 12, and this, because of the physical displacement of windings 11 and 12, generates a voltage in the rotor 13 which produces a torque causing its rotation. Since the resistance of auxiliary winding 12 is relatively low, the voltage applied to coil 32 of relay 25 is approximately equal to the voltage impressed across line conductors 16 and 17. This winding, therefore, is formed so as to have a relatively high resistance and may be referred to as the potential winding of the relay 25. Coil 31, however, has a relatively low resistance, permitting a relatively large flow of current through this coil, and consequently it may be considered as the current winding of relay 25. When rotor 13 is stationary or moving relatively slowly, the armature 26 is urged against fixed contacts 27 and 28 by spring 30, and hence there is a relatively large flow of current through coil 31 and capacitor 42. Under these conditions, the magnetizing effect of current coil 31 substantially equals or exceeds the magnetizing effect of potential coil 32, and armature 26 thus remains in its released position, completing the circuit through contacts 27 and 28.

As the speed of rotor 13 increases, a transformer action occurs between the rotor and auxiliary winding 12 resulting in a decrease in the flow of current through capacitor 41, and an increase in voltage between the terminals thereof to a value which substantially exceeds that of the line conductors 16 and 17. The magnetizing effect of the current coil 31 is thus decreased by reason of the smaller amount of current flowing therethrough, while the increased potential appearing across the potential coil 32 increases its magnetizing effect. As the magnetizing effect of current coil 31 is decreased and that of the potential coil 32 is increased, a point is reached where armature 26 is attracted to the potential coil 32 with sufficient force to overcome the urging of spring 30, and the armature 26 is moved away from the fixed contacts 27 and 28, removing capacitor 42 and current coil 31 from the circuit. The magnetic effect of the current coil 31 is thus completely removed from armature and potential coil 32 thus holds the armature 26 away from the fixed contacts 27 and 28, unopposed except by spring 30. The decrease of current through capacitor 42 and the increase of voltage appearing between the terminals of the latter provide a means for operating the relay 25 in a positive and certain manner, since these variables change through wide limits between stopped and full speed rotation of rotor 13.

When it is desired to reverse the direction of rotation of the rotor 13, switch 23 is moved from one position to the other. When this is done, all current through the auxiliary winding 12 is momentarily interrupted, and potential coil 32 of relay 25 is de-energized, permitting spring 30 to move armature 26 against fixed contacts 27 and 28. When switch 23 is then closed in its new position, the electrical position of auxiliary winding 12 has been reversed and it now opposes the direction of rotation of rotor 13 which it previously aided. Because of the transformer action existing between auxiliary winding 12 and rotor 13, the voltage across capacitor 42 remains relatively low and the current therethrough remains relatively high, thereby insuring that the magnetizing effect of current coil 31 equals or exceeds that of potential coil 32. Armature 26 therefore remains against contacts 27 and 28, and the rotor 13 rapidly comes to a halt and then starts rotating in the opposite direction. As it approaches full speed, the magnetizing effect of coils 31 and 32 changes as previously described, and armature 26 is moved from contacts 27 and 28 to remove capacitor 42 from the circuit of the auxiliary winding 12 as the rotor 13 approaches full speed.

It will thus be seen that by proper operation of the reversing switch 23, rotor 13 may be stopped very quickly in a manner very similar to that of "plugging" a direct current motor. This rapid stopping and reversal of a split phase motor has heretofore been considered impractical by any simple means, and this motor control therefore greatly extends the field of usefulness of such motors. In addition, the relay 25 and its method of connection provides for positive action of the armature 26 in removing the capacitor 42 from the circuit of the auxiliary winding 12, since the relative change in the magnetizing force acting on the armature is much greater than in previous controls.

It will be apparent that modifications may be made which do not in any way depart from the spirit of my invention as defined herein, and while I have shown and described a preferred form thereof, I do not wish to be limited to the particular form and arrangement of parts herein described and shown, except as covered by my claims.

The invention claimed is:

1. A motor control for a single phase induction motor having a main field winding, an auxiliary field winding adapted to be used with a capacitor, and a rotor, the control including: a capacitor; a differentially wound relay having a pair of normally closed contacts adapted to be opened when the magnetizing effect of a potential coil of said relay exceeds the magnetizing effect of a current coil of said relay; means connecting said current coil, said capacitor, and said contacts in series with each other and in parallel with said potential coil; a reversing switch having a first pair of terminals, each of which may be selectively connected to either of a second pair of terminals; and means connecting said series-parallel circuit to one of said first pair of terminals and in series with said auxiliary field winding, the other terminal of said auxiliary winding being connected to the other terminal of said first pair of terminals, and said second pair of terminals being connected in parallel with the terminals of said main field winding and adapted to be connected to a source of alternating current.

2. A motor control for a single phase induction motor having a main field winding, an auxiliary field winding adapted to be used with a capacitor, and a rotor, the control including: a capacitor; a relay having a potential coil and a current coil, and a pair of normally closed contacts adapted to be opened when the net magnetic force of said coils exceeds a predetermined amount; a pair of conductors adapted to be connected to a source of alternating current; means connecting said main field winding to said conductors for energization thereby; means connecting said current coil, said capacitor, and said contacts in series with each other to form a series circuit connected in parallel with said potential coil, said current coil and said series coil being connected so that their magnetic effects oppose each other; and means connecting said series-parallel circuit in series with said auxiliary field winding to form a series circuit which is connected to said conductors in parallel with said main field winding.

3. A motor control for a single phase induction motor having a main field winding, an auxiliary field winding adapted to be used with a capacitor, and a rotor, the control including: a capacitor; a relay having a pair of operating coils and a pair of normally closed contacts adapted to be opened when the magnetic force of one said coils exceeds that of the other; means connecting one of said coils in series with said capacitor and said contacts to form a series circuit; means connecting the other of said coils in parallel with said series circuit to form a series-parallel circuit in which the magnetic effect of said last mentioned coil is determined by the voltage appearing between the ends of said series circuit, and in which the magnetic effect of said first mentioned coil is opposed to that of said last mentioned coil and is determined by the current flowing in said series circuit; a pair of conductors adapted to be attached to a source of alternating current; means connecting said auxiliary field winding in series with said series-parallel circuit and to said conductors; and means connecting said main field winding to said conductors.

4. A motor control for a single phase induction motor having a main field winding, an auxiliary field winding adapted to be used with a capacitor, and a rotor, the control including: a capacitor; a relay having a pair of normally closed contacts and a pair of operating coils; means connecting said auxiliary field winding to said relay and said capacitor so that one of said coils is responsive to the voltage appearing across the terminals of said capacitor and the other coil opposes said first coil and is responsive to the current flowing through said capacitor, whereby said contacts are opened and said capacitor removed from in series with said auxiliary winding when the magnetic effect of said first mentioned coil exceeds that of said last mentioned coil; a pair of conductors adapted to be attached to a source of alternating current; means connecting said auxiliary winding in series with said relay to said conductors; and means connecting said main winding to said conductors.

5. A motor control for a single phase induction motor having a main field winding, an auxiliary field winding adapted to be used with a capacitor and a rotor, the control including: a capacitor; a relay having a pair of operating coils so connected to said capacitor that one of said coils is responsive to the current flowing through said capacitor and the other of said coils opposes the action of said first coil and is responsive to the voltage appearing across the terminals of said capacitor, whereby said capacitor is disconnected when the magnetic effect of said last mentioned coil exceeds the magnetic effect of said first mentioned coil; a pair of conductors adapted to be attached to a source of alternating current; means connecting said auxiliary field winding in series with said relay to said conductors; and means connecting said main field winding to said conductors.

6. A motor control for a single phase induction motor having a main field winding, an auxiliary field winding adapted to be used with a capacitor, and a rotor, the control including: a capacitor; a relay having a pair of coils and so connected to said capacitor and said auxiliary field winding that said capacitor is normally in series with said auxiliary winding but is disconnected therefrom when the magnetic effect of one of said coils which is responsive to the voltage appearing across said condenser, exceeds the magnetic effect of the other of said coils which is responsive to the current flowing through said capacitor; a pair of conductors adapted to be attached to a source of alternating current; means connecting said main field winding to said conductors; and means connecting said auxiliary field winding and said relay to said conductors.

7. A motor control for a single phase induction motor having a main field winding, an auxiliary field winding adapted to be used with a capacitor, and a rotor, the control including: a capacitor; a relay having a pair of coils and so connected to said capacitor and said auxiliary field winding that said capacitor is normally in series with said auxiliary winding but is disconnected therefrom when the magnetic effect of one of said coils which is responsive to the voltage appearing across said condenser, exceeds the magnetic effect of the other of said coils which is responsive to the current flowing through said capacitor; a pair of conductors adapted to be attached to a source of alternating current; means connecting said main field winding to said conductors; a reversing switch having a position for clockwise rotation of said rotor and a position for counter-clockwise rotation of said rotor, said switch opening any circuit connected through it, in moving from one of said positions to the other; means connecting said auxiliary winding and said relay to said switch; and means connecting said switch to said conductors, whereby moving said switch from one position to the other interrupts the circuit through said relay to reconnect said capacitor in said circuit, and then reconnects said relay and said auxiliary winding to said conductors so that the phasing of said auxiliary winding is reversed.

8. A motor control for a single phase induction motor having a main field winding, an auxiliary field winding adapted to be used with a capacitor, and a rotor, the control including: a capacitor; means adapted to connect said capacitor in series with said auxiliary field winding; a relay having an operating coil in series with said auxiliary field winding and in parallel with said capacitor, whereby said capacitor is disconnected as said motor approaches full speed; a pair of conductors adapted to be connected to a source of alternating current; means connecting said main winding to said conductors; and a reversing switch adapted to connect said relay, in series with said auxiliary winding, to said conductors to cause rotation in one direction, and selectively to interrupt said circuit, thereby reconnecting said capacitor in said circuit, and then reverse the connection of said circuit to said conductors to reverse the phase of said auxiliary winding and thereby reverse the rotation of said motor.

HAROLD E. CROZIER.